United States Patent [19]

Lauser

[11] Patent Number: 4,614,307
[45] Date of Patent: Sep. 30, 1986

[54] APPARATUS FOR THE GRANULATING OF PLASTIC MATERIAL WITH AXIAL ADJUSTMENT OF THE CUTTING HEAD

[75] Inventor: Wolfgang Lauser, Leonberg, Fed. Rep. of Germany

[73] Assignee: Werner & Pfleiderer, Stuttgart, Fed. Rep. of Germany

[21] Appl. No.: 693,289

[22] Filed: Jan. 22, 1985

[30] Foreign Application Priority Data

Feb. 18, 1984 [DE] Fed. Rep. of Germany ....... 3405978

[51] Int. Cl.$^4$ ............................................. B02C 18/18
[52] U.S. Cl. .................................... 241/101.4; 241/3; 241/282.1; 425/313
[58] Field of Search ............... 83/356.3; 264/142, 148; 425/313, 309, 310; 241/3, 777, 282.1, 282.2, 101.4

[56] References Cited

U.S. PATENT DOCUMENTS 3,467,987 9/1969 Foster ................................. 425/313
4,184,833 1/1980 Buchan et al. ................. 425/313 X Primary Examiner—Mark Rosenbaum
Attorney, Agent, or Firm—Roberts, Spiecens & Cohen

[57] ABSTRACT

Apparatus for granulating plastic materials which comprises a housing adapted for connection to a granulating hood and including a knife shaft supporting a knife head having cutting knives proximate a perforated plate of an extruder. The knife shaft is mounted for axial displacement by a bearing sleeve which can be actuated by a hydraulic cylinder unit. In order to operate the cutting knives at an adjustable distance from the perforated plate or with constant pressing force, the bearing sleeve is displaceably supported in the housing in a bore which receives the knife shaft, and one end of the bearing sleeve bears against a compression spring which in turn bears against the housing to oppose advance of the knife shaft towards the perforated plate.

10 Claims, 2 Drawing Figures

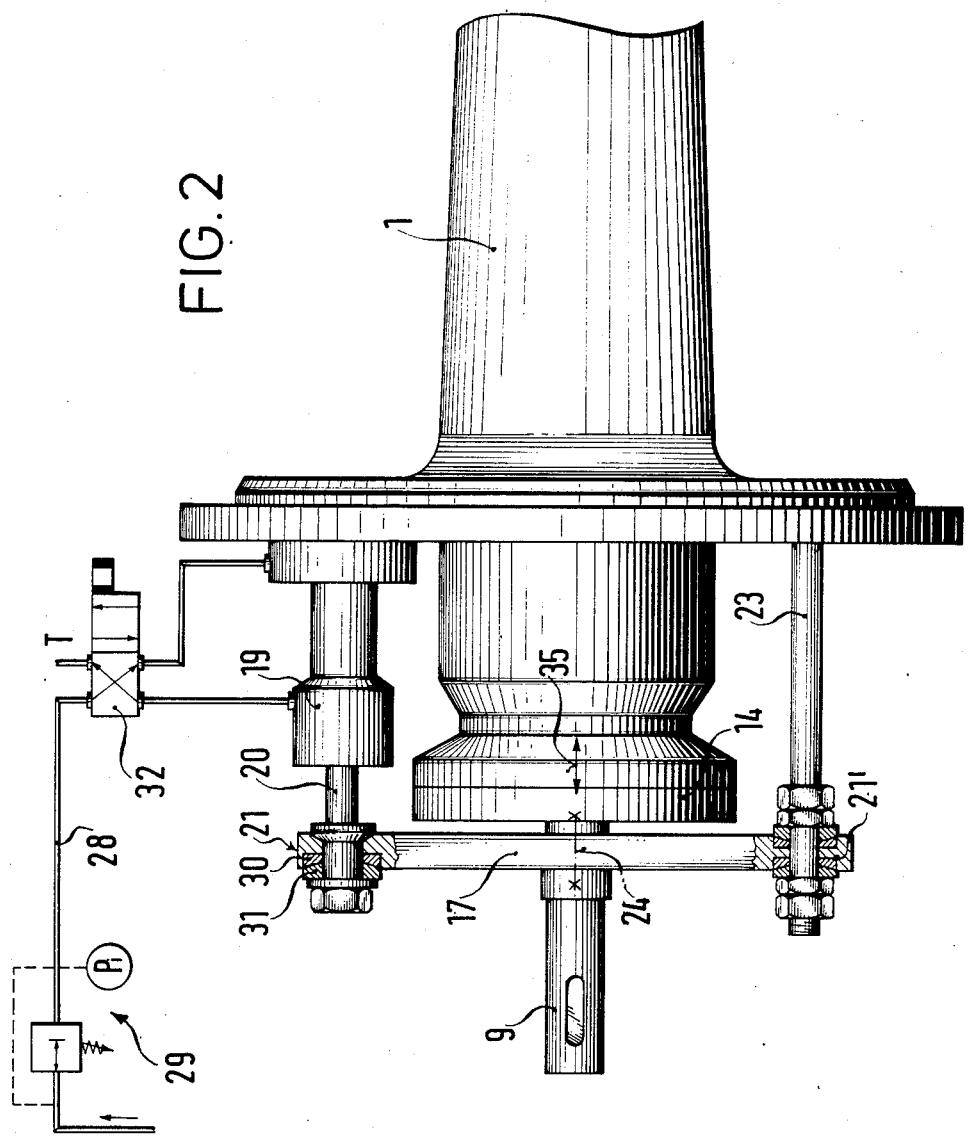

APPARATUS FOR THE GRANULATING OF PLASTIC MATERIAL WITH AXIAL ADJUSTMENT OF THE CUTTING HEAD

FIELD OF THE INVENTION

The present invention relates to apparatus for granulating plastic materials and particularly to apparatus comprising a housing adapted to be connected to a granulating hood, a knife shaft which supports a knife head having cutting knives, said shaft being mounted in the housing by means of anti-friction bearings in a bearing sleeve and being displaceable longitudinally together with said sleeve by a hydraulic-cylinder unit; and a support arm engaging the bearing sleeve.

DESCRIPTION OF PRIOR ART

Such granulating apparatus is known from U.S. Pat. No. 3,271,821. Therein, the knife shaft which is displaceable along its longitudinal axis and mounted for rotation in the housing is moved by hydraulic-cylinder units toward the perforated plate of a plastic extruder so as to bring the cutting knives fastened to the knife head into cutting position, i.e. bearing against the perforated plate.

The extensive contact of the cutting knives with the cutting surface, which in operating condition is obtained continuously under tension, is produced by compression springs in the knife head which is movable in a longitudinal axial direction with respect to the knife shaft.

The non-rigid guidance of the knife head with respect to the drivable knife shaft and increased wear of the perforated plate produced by the uncontrollable pressing force of the cutting knives constitute disadvantages of the apparatus. Additionally, cutting cannot be effected with the cutting knives spaced from the perforated plate in the event that this is desired.

SUMMARY OF THE INVENTION

An object of the invention is to provide granulating apparatus whose cutting knives can be operated both under constant uniformly adjustable pressing force or at an adjustable distance from the perforated plate.

The above and further objects of the invention are achieved by a construction in which the bearing sleeve is displaceably mounted in a bore in the housing which receives the knife shaft and the bearing sleeve is acted on at one end by a compression spring which is concentric to the knife shaft as supported in the housing to oppose advance of the knife head towards the perforated plate of the extruder.

The advance of the knife shaft effected by the hydraulic-cylinder unit takes place increasingly under load as a function of a given path of displacement so that after the operating region of the knives on the perforated plate has been reached there is obtained the fully latently active force of advance, which is adjustable on the basis of a pressure regulating device, but compensated for by the force of deformation of the compression spring. In this way, there is obtained a continuous, uniform feeding movement of the knife head in the longitudinal axial direction. The cutting knives of the knife head can, in accordance herewith, granulate effectively within a work region which can be fixed in each case at an exact distance from the perforated plate. Due to the equalizing action of the forces within the work region, the knife shaft assumes a working position which is substantially free of oscillations. Furthermore, the knife shaft can be adjusted to bring the cutting knives against the perforated plate and the pressing force of the cutting knives against the perforated plate can be exactly determined within a limited adjustment range as a function of the further feed path. The pressing force results from the relative pressing force of the hydraulic-cylinder unit after the spring force has been overcome. In this way a weak resilient contact of the cutting knives against the perforated plate is assured in any resting position within the adjustable working region.

In further accordance with the invention, the bearing sleeve is connected in force-locked manner with the support arm by abutment members having lenticular surfaces acting on the end of said bearing sleeve opposite the compression spring at equal distances from the axis of the knife shaft.

Thereby the introduction of the force for the displacement movement of the bearing sleeve takes place axially and guidance is achieved which is substantially free from canting. The central introduction of the force is advantageous as regards the life of the axial bearings which support the knife shaft.

In further accordance with the invention, the support arm is pivotally connected by a spherical bearing to the piston of the hydraulic cylinder unit and, opposite the point of attachment thereof, to a bearing support which is rigidly connected to the housing. Consequently, the action of transverse forces on the bearing sleeve and the hydraulic cylinder unit is prevented so that a uniform feeding of the knife shaft is obtained.

In accordance with yet another feature of the invention the bearing sleeve is connected to the support arm by a spacer sleeve which encloses the anti-friction bearing, said spacer sleeve supporting a shoulder ring which rides in a recess at the periphery of the housing and, said spacer sleeve and the housing limiting the path of displacement of the bearing sleeve with respect to the housing.

BRIEF DESCRIPTION OF THE FIGURES OF THE DRAWING

The invention will be described in detail with reference to one embodiment thereof, which is illustrated in the drawing, in which:

FIG. 2 is a top, plan view, partly in section, of the granulating apparatus of FIG. 1.

DETAILED DESCRIPTION OF A PREFERRED EMBODIMENT

Figure 1:
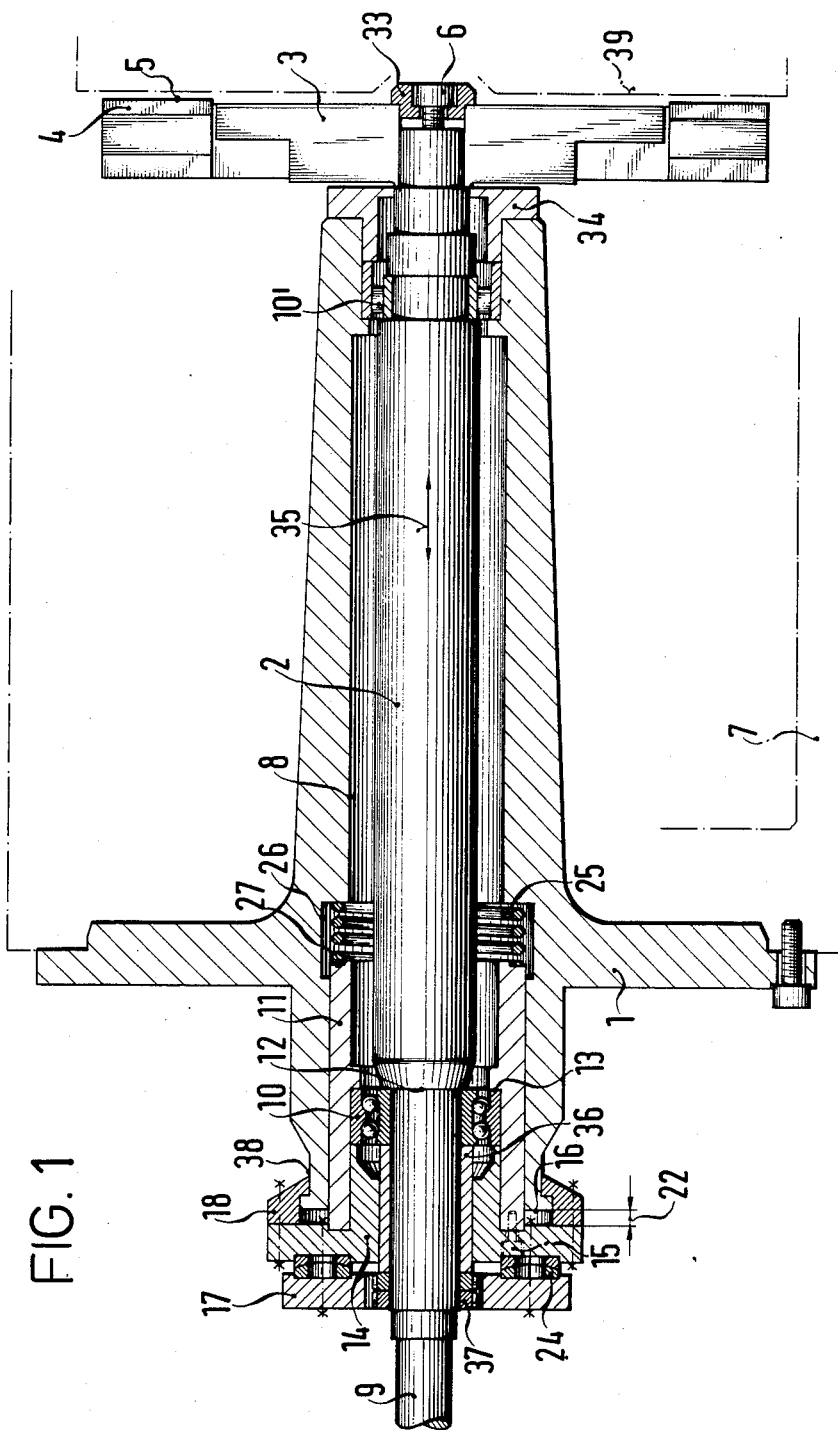
FIG. 1 is a longitudinal sectional view of granulating apparatus with a housing adapted for connection to a granulating hood.

The granulating apparatus shown in FIG. 1 comprises a housing 1 in which is a rotatable knife shaft 2 to which is secured a knife head 3 having cutting knives 4. The cutting knives 4 define a cutting surface 5 which is located in front of the surface of a perforated plate 39 (not shown in detail) of an extruder. The knife head 3 is attached directly on the knife shaft 2 by means of a clamping plate 33 and a fastening screw 6. The housing 1 is secured by bolts to a water-conducting granulating hood 7, shown only in outline, in which the granulate which has been formed is collected in a collecting chamber and conveyed away in known manner.

The knife shaft 2, which extends along a bore 8 in the housing 1, is driven in rotation by a shaft journal 9. The knife shaft is rotatably supported in anti-friction bearings 10 and 10' respectively which are surrounded, within the housing 1, by a spacer sleeve 14 and a closure disk 34 respectively.

In order to be able to displace the knife shaft 2 axially, as indicated by the arrows 35, a longitudinally displaceable bearing sleeve 11 is arranged in bore 8 and receives the knife shaft 2 by means of the anti-friction bearing 10 which abuts against a shoulder 12 of the knife shaft. The anti-friction bearing 10 also abuts against a shoulder 13 of the bearing sleeve 11 and is held in place by means of a spacer sleeve 14, which is attached to the bearing sleeve 11 by fastening screws 15. A clamping sleeve 36, which is fastened on the knife shaft 2 by lock nuts 37, holds the anti-friction bearing 10 in position.

A clearance 22, representing a maximum displacement path, is formed between surface 16 of housing 1 and the spacer sleeve 14 and corresponds to the maximum range of axial adjustment of the cutting knives 4. The displacement of sleeve 14 is guided by a shoulder ring 18 which is rigidly connected to the spacer sleeve 14 and is displaceable in a recess 38 formed in the outer surface of the housing 1.

A forward movement of the bearing sleeve 11 with the spacer sleeve 14 is effected against the force of a compression spring 25 which rests in a recess 26 of the bore 8 and bears against an end 27 of the bearing sleeve 11.

The forward movement is effected through a support arm 17 by a hydraulic cylinder unit 19 shown in FIG. 2. For this purpose, the cylinder unit 19 is rigidly attached to the housing 1 and a piston rod 20 of unit 19 is connected to the support arm 17 by a spherical bearing 21 consisting of a bearing bushing 30 and a bearing body 31. At the other end of the support arm 17 is a spherical bearing 21', constructed in the same manner as bearing 21, and by which the support arm 17 is pivotally connected to a bearing support 23 which is rigidly connected to the housing 1.

The transmission of force from the hydraulic cylinder unit 19 to the spacer sleeve 14 takes place via the support arm 17 by further abutments 24 which are secured to the arm 17 in such a manner as to be carried along with the arm. The abutments 24 have convex, lenticular surfaces which come into contact with corresponding concave surfaces of abutments on the spacer sleeve 14. The abutments 24 are located at equal distances from the axis of the knife shaft to assure that forces will be applied axially to the bearing sleeve which will travel without canting.

In the condition of rest, i.e. with cylinder unit 19 relieved of load in the operating direction of the knife shaft 2, as shown in FIG. 2, the compression spring 25 effects retractio of the knife shaft 2, and thus of the knife head 3, by an amount equal to the clearance 22 with the bearing sleeve 11 resting against the spacer sleeve 14.

In the operating condition, the hydraulic-cylinder unit 19 applies a force in the working direction of the knife shaft 2 against the opposition of compression spring 25 via the bearing sleeve 11 to take-up clearance 22 while the knife shaft 2 remains free of load.

A pressure-regulating device 29 which monitors the hydraulic-cylinder unit 19 is arranged in front of a control valve 32 in a feed line 28 for the cylinder unit 19 and pressure-regulating device 29 is adjusted to produce a fixed magnitude of displacement to position the knife head 3 at a desired distance from the perforated plate 39 when the cutting of the granulate is to be effected at a distance from the plate 39.

If it is desired to effect the cutting of the granulate directly by pressing the cutting knives 4 against the perforated plate 39, the knife shaft 2 is advanced by the hydraulic cylinder unit 19 against the bearing sleeve 11 until the cutting knives 4 come up against the perforated plate 39 so that the axial longitudinal movement of the knife shaft 2 comes to a halt. Upon a slight further advance of the bearing sleeve 11, the knife shaft 2, and thus the knife head 3 and cutting knives 4, are subjected to an initial stress which is effective as a knife application force and which results from the difference between the hydraulic force of advance of the cylinder unit 19 over the adjustable pressure-regulating device 29 and the effective force of the compression spring 25.

In this way, a resilient application of the cutting knives 4 against the perforated plate 39 is obtained in simple fashion, so that granulate can be cut under constant conditions over the entire cutting surface 5. An advance of the cutting knives 4 takes place automatically upon wear of the knives by displacement of the entire knife shaft 2. The cutting knives 4 accordingly operate substantially free of oscillation.

Although the invention has been described in relation to a specific embodiment thereof, numerous modifications and variations can be made within the scope and spirit of the invention as defined by the attached claims.

What is claimed is:

1. Apparatus for granulating plastic material comprising a housing, a granulating hood connected to said housing in adjacent relation to an extruder of plastic material, a knife shaft including a knife head having cutting knives, said housing having a longitudinal bore, said knife shaft extending in said bore with the knife head opposite the extruder for granulating plastic material coming from the extruder, a bearing sleeve surrounding said shaft and displaceably mounted in said bore for movement longitudinally thereof, bearing means in said sleeve rotatably supporting said knife shaft, connecting means operatively coupling said sleeve, bearing means and said knife shaft for common movement longitudinally in a direction to advance the knife head towards said extruder, a support arm operatively coupled to said connecting means for longitudinally displacing said support arm, drive means for longitudinally displacing said support arm, and a compression spring in said bore in said housing concentrically surrounding said knife shaft and engaging said sleeve to oppose longitudinal displacement thereof in a direction in which the knife head is advanced towards the extruder, said compression spring and drive means acting in opposite directions axially of said knife shaft and applying net axial force to said shaft through said bearing means to cause the knife head to granulate the plastic material from the extruder.

2. Apparatus as claimed in claim 1 wherein said connecting means comprises a plurality of abutment means located at equal distances from the axis of said knife shaft for transmitting force from the support arm to the bearing sleeve, said abutment means including lenticular bearing surfaces.

3. Apparatus as claimed in claim 1 comprising means pivotably connecting said drive means and said support arm.

4. Apparatus as claimed in claim 3 wherein said means pivotably connecting said drive means and said support arm includes a spherical bearing.

5. Apparatus as claimed in claim 4 wherein said spherical bearing is attached to said arm, at a location offset from the axis of said knife shaft, and means at a location diametrically opposite said spherical bearing for connecting said arm to said housing.

6. Apparatus as claimed in claim 5 wherein said means which connects the arm to the housing in diametric opposition to said spherical bearing comprises a further spherical bearing.

7. Apparatus as claimed in claim 6 further comprising a bearing support rigidly connected to said housing, said further spherical bearing connecting said bearing support and said arm.

8. Apparatus as claimed in claim 1 wherein said connecting means comprises a spacer sleeve in which said bearing means is secured, a shoulder ring secured to said spacer sleeve and a recess in said housing in which said shoulder ring is displaceable.

9. Apparatus as claimed in claim 8 wherein said spacer ring and housing have opposed abutment surfaces which in an initial position of said cutting head are spaced from one another and limit the displacement of said bearing sleeve by said drive means.

10. Apparatus as claimed in claim 1 comprising means securing said knife head to said knife shaft.

* * * * *